United States Patent [19]
Hamy

[11] 3,901,550
[45] Aug. 26, 1975

[54] PASSIVE RESTRAINT SEAT SYSTEM

[75] Inventor: Norbert Hamy, Beaconsfield, Canada

[73] Assignee: Trebron Holdings Limited, Beaconsfield, Canada

[22] Filed: Feb. 28, 1974

[21] Appl. No.: 446,904

[30] Foreign Application Priority Data
Mar. 3, 1973 United Kingdom............... 10459/73

[52] U.S. Cl. ............................ 297/390; 280/150 B
[51] Int. Cl.²........................................ A47C 31/00
[58] Field of Search ........... 297/384, 389, 390, 216; 280/150 B

[56] References Cited
UNITED STATES PATENTS

| | | | |
|---|---|---|---|
| 3,405,971 | 10/1968 | Kobrehel | 297/216 |
| 3,623,768 | 11/1971 | Capener | 297/390 |
| 3,700,281 | 10/1972 | Servadio | 297/390 |

*Primary Examiner*—James C. Mitchell
*Attorney, Agent, or Firm*—Robert J. Schaap

[57] ABSTRACT

A restraint system for a vehicle comprising at least one guard arm adapted for bending movement, tension strap means carried within the guard arm and secured to one end thereof, and means to apply a force to the other end of the tension strap means to bend the guard arm to a restraining position to at least partially encircle a portion of a body of a vehicle occupant. The guard arm is particularly suitable for use in a passive restraint system.

29 Claims, 15 Drawing Figures

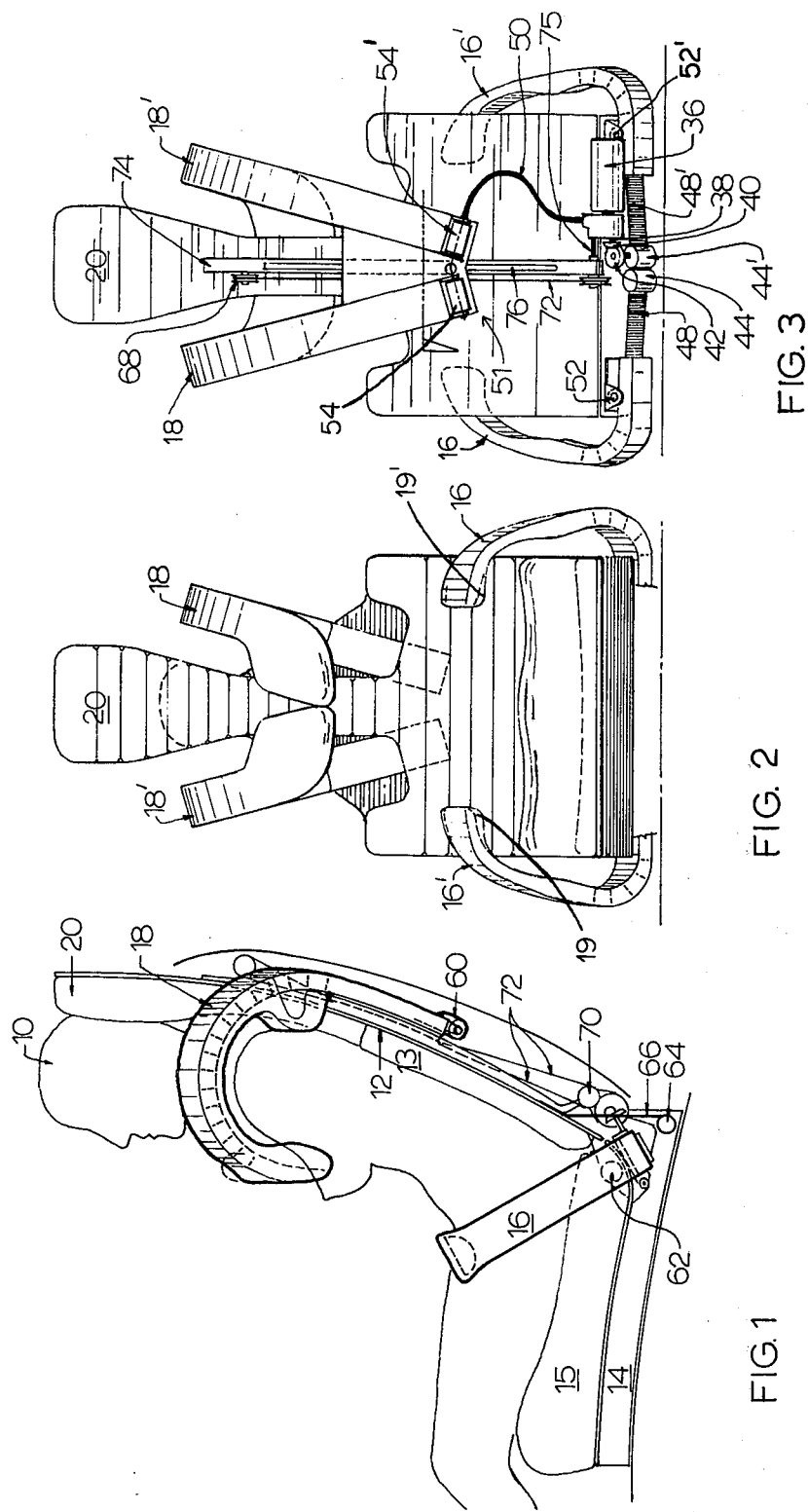

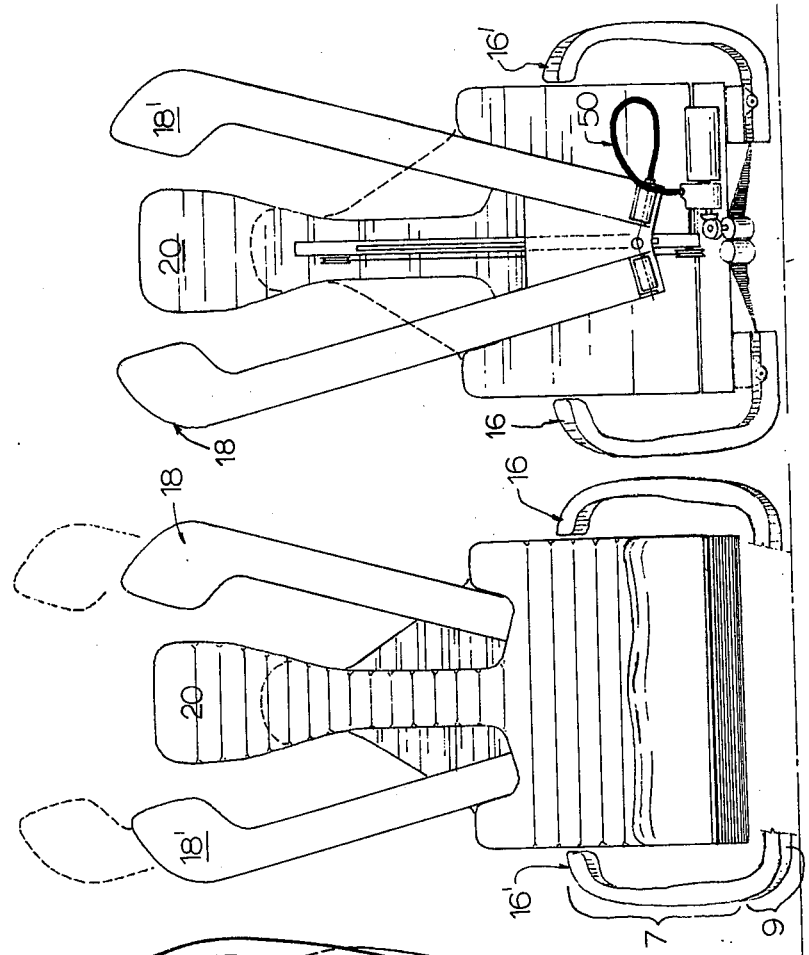
FIG. 6
FIG. 5
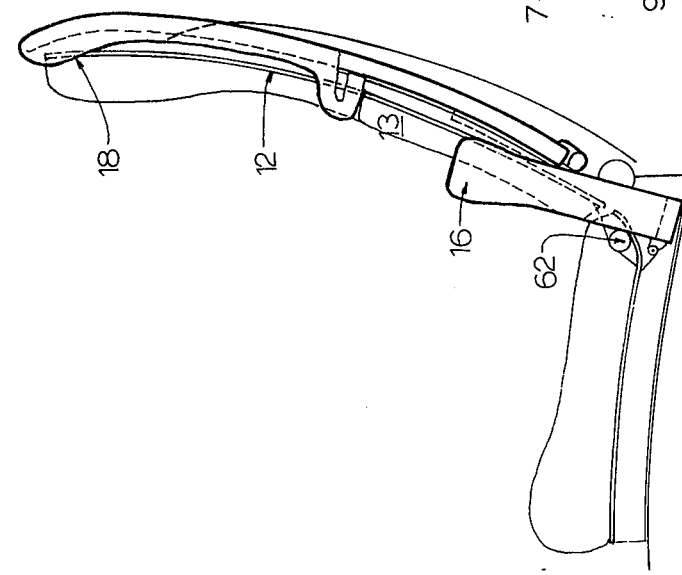
FIG. 4

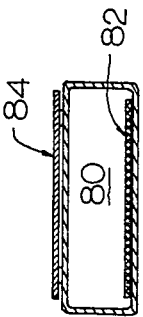
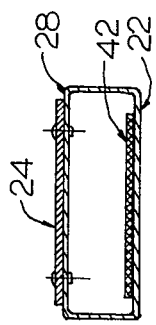
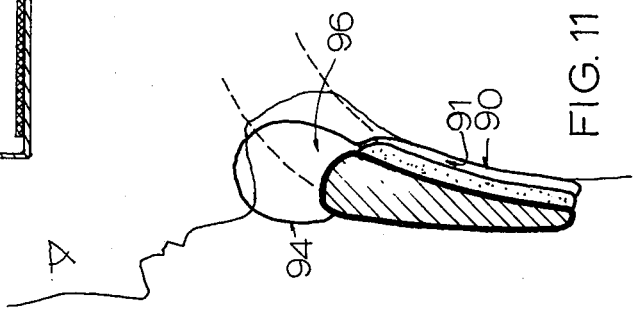
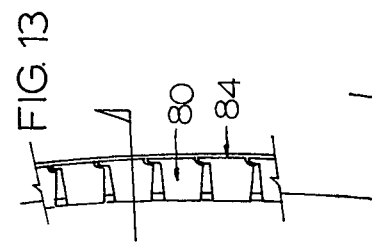
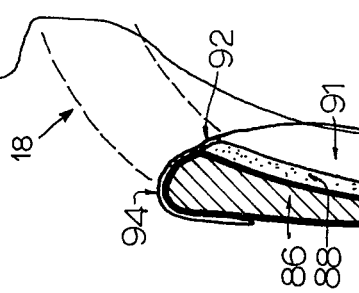
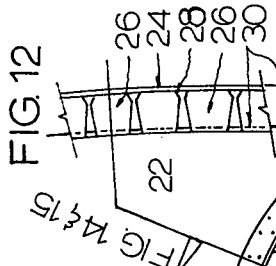
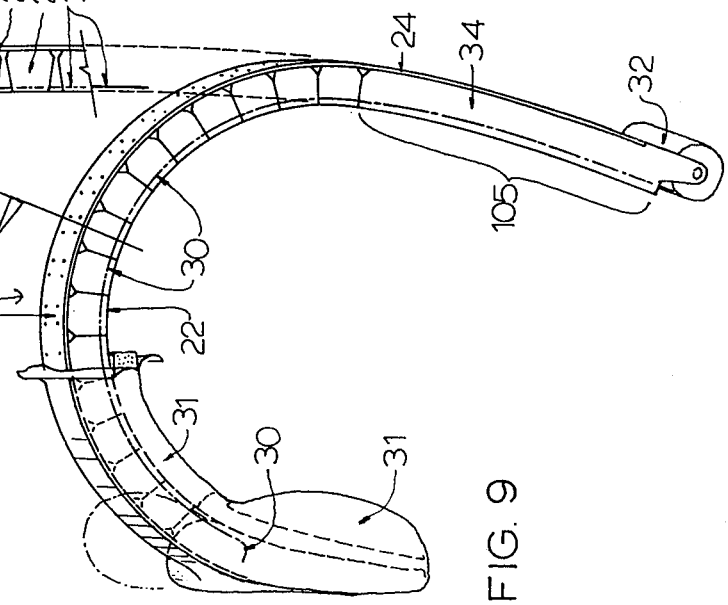

PASSIVE RESTRAINT SEAT SYSTEM

This invention relates in general to vehicle seat restraint systems and more particularly, to certain new and useful improvements suitable for use in vehicle seat passive restraint systems hich automatically retrain passengers in a vehicle seat for a duration of travel.

Various passenger restraint systems suitable for use in a vehicle are well known in the art and may be said to fall into two groups — the first such group relating to those systems which require a positive action by the occupant of the vehicle to deploy the same; the second group relating to those systems which are automatically deployed when an occupant performs the normal functions needed to set the vehicle in motion and as such, may be termed "passive restraint systems".

Restraint systems may be used in automotive vehicles, air transport vehicles and similar vehicles, however, they often remain unused by the occupants due to their complexity and cumbersomeness and the inherent distractions of convenience and comfort. Typical of such systems is the multi-point belt system. However, it has been found that many passengers have failed to utilize the system provided. Even with the additional attempted motivations to employ these restraining multi-point belt systems, such as warning lights, buzzers, interlocks, and the like, passengers still attempt to obviate the use of these systems. In an attempt to minimize injuries and/or deaths in vehicle collisions, some countries have passed or are considering passing laws making the use of a restraint system obligatory. Furthermore, there has been much discussion about making the use of "passive restraint systems" obligatory in the manufacture of all new vehicles.

Prior art developments include systems which may be categorized as being "passive restraint systems". Some such systems include air bag systems, net systems, chest pad systems, padded environment systems and the like. Of the above systems, the air bag system has been deemed by many to be the most promising and commercially viable, and has recently become commercially available. However, there still remains a number of problems associated with air bag systems; which systems are triggered by the impact of the vehicle with an external object and create an air bag or cushion in front of the occupant thereby preventing the collision of the occupant with the interior of the vehicle.

The air bag systems have been found to have a number of drawbacks including the fact that the pressure rise and the noise level inside the vehicle when the air bag is inflated introduces the risk of ear drum rupture. In addition, these systems require the correct positioning of the passengers, otherwise, as shown in tests, the passenger may slip sideways between air bag cushions and be not properly restrained at all. In addition, the need to be seated in just the right place and the backward movement caused by the violent inflation of the bag has made some of the air bag systems virtually useless for the protection of children within the vehicles. Furthermore, the lateral and roll-over restraint provided by the air bag system has been found to be less than optimum.

The passive restraint systems proposed to date have also been found to be lacking in a number of other areas. Thus, for example, the problem of accidental deployment is a great one and conceivably, could in itself, cause accident and injury. Most of the passive restraint systems employ air bags, nets, or the like and therefore, if the system is accidentally deployed, a protective covering or the like is thrown about the passenger which, if the vehicle is in motion, could cause the driver of the vehicle to lose control. Still further, the reliability and the need to replace the system once the system has been once deployed remain a problem. Even further, it is not clear how the proposed prior art passive restraint systems would deal with those wearing glasses or smoking. From the above, it may be seen that some of the passive restraint systems pose as many problems as they solve.

It is therefore an object of the present invention to provide for restraining means in a vehicle restraint system which are constantly deployed, yet may be utilized in a "passive restraint system".

A further object of the present invention is to provide for a guard arm suitable for use in a vehicle restraint system, which guard arm is adapted to partially encircle the vehicle occupant and restrain the occupant.

It is also an object of this invention to provide for a passive restraint system which does not interfere with nor compromise the convenience and comfort of the vehicle occupants.

It is a further object of this invention to provide for a passive restraint system which is automatically deployed when the vehicle is in motion and remains so deployed during the duration of travel.

It is a further object of this invention to provide for a passive restraint system wherein the points of restraint are distributed over four strategic anatomical areas of the body.

It is a still further object of the present invention to provide for a passive restraint system which provides maximum lateral and roll-over protection to the vehicle occupants, the system being automatically deployed during travel of the vehicle, the system permitting ingress and egress of passengers from the vehicle without compromising their comfort and convenience.

Generally, according to the present invention, there is provided a guard arm suitable for use in a vehicle restraint system, said guard arm being adapted for bending movement, a tension means carried within at least a portion of said guard arm, one end of the tension means being secured to the guard arm, means to apply a force to the other end of the tension means to bend the guard arm to a restraining position to at least partially encircle a portion of a body of a vehicle occupant.

According to a further aspect of the present invention, there is provided for in a vehicle having seat means and back support means associated therewith an improved restraint system comprising an upper guard arm assembly and a lower guard arm assembly, said lower guard arm assembly including a pair of side guard arms positioned on either side of a passenger, each of said side guard arms adapted to engage the hip portion of the passenger when positioned on the seat means, said upper guard arm assembly including a pair of shoulder guard arms positioned on either side of the passenger, each of said shoulder guard arms adapted to engage the shoulder/chest area of the passenger, each of said aforementioned guard arms having at least a portion of a segmented construction, tension strap means within at least a segmented portion of said guard arms, one end of said tension strap means being connected to said guard arms, and means for applying a force to the other end of said tension strap means whereby said segmented portions of said guard arms will bend and said guard arms will at least partially encircle the passenger.

In a still further aspect of the present invention, there is shown in a guard arm construction adapted to restrain a passenger in a vehicle, the improvement wherein the guard arm includes an enclosed fluid containing chamber, valve means, and a further chamber, said valve means being positioned intermediate said fluid containing chamber and siad further chamber, said valve means retaining fluid within said fluid containing chamber under low external pressure conditions applied thereto, said valve means permitting the passage of the fluid from said fluid-containing chamber to said further chamber under increased external pressure thereon whereby the fluid will flow through said valve means to said further chamber, said further chamber forming a restraining means for the head of a passenger.

In the disclosure and claims of the instant application, a guard arm is defined to be a restraining member adapted to restrain at least a portion of a passenger in a vehicle. As such, the guard arms of the present invention are particularly suitable for use in a passive restraint system; it being understood that such guard arms may equally well be used in ordinary restraint systems — i.e. non-passive restraint systems. Furthermore, it is understood that the present invention relates to restraining members and restraining systems suitable for any passenger carrying vehicle whether it be automobile, air cushion vehicle, airplane, boat, etc. Also, as is conventional, the guard arms may be provided for one or all occupants or passengers of a vehicle. Still further, the seat means which are employed in a vehicle may be any conventional with suitable adaptation of the guard arms of the present invention. Thus, reference herein will be made to preferred embodiments of the seat means, it being understood that any seat means may be employed.

In greater detail, the guard arm of the present invention may be characterized as being adapted for bending movement whereby at least a portion of the guard arm may be bent from a first position to a restraining position whereby the guard arm at least partially encircles a portion of the body of the vehicle occupant. Means for accomplishing the bending movement of the guard arm comprises tension means located within the guard arm, one end of the tension means being fixedly secured to the guard arm, the other end of the tension means being connected to a suitable means for applying a force thereto.

The guard arm is generally of an elongated construction with one end of the elongated construction adapted to contact and encircle a vehicle passenger. The cross sectional configuration of the guard arm may be any which is suitable; reference herein will be made to a guard arm having a substantially rectangular cross sectional configuration, it being well within the skill of those knowledgeable in the art to vary the configuration.

According to one aspect of the present invention, the bendable portion of the guard arm is of a segmented construction, the segmented portion enabling the guard arm to bend or assume an arcuate configuration.

According to one aspect of the passive restraint system of the present invention, the guard arms have a poetion of a preformed configuration and a further portion of the aforementioned segmented construction. As will be seen, the portion adapted to engage and restrain the occupant on a vehicle seat may be either of these portions. As such, the portion or portions contacting the vehicle occupant may be padded so as to have a somewhat shock-absorbing action and eliminate any sharp edges or abutments.

Interiorly of the guard arms, there are provided for tension means, the tension means extending longitudinally of the guard arms for at least the segmented portion of the guard arms; the tension means further being connected at one end thereof to an interior portion of the guard arm. Also, there are provided for means for applying a force to the other end of the tension means in a manner to be discussed. With one end of the tension means attached to the guard arm, a force applied to the other end of the tension means will, due to the segmented construction of a portion of the guard arm, cause the guard arm to bend or assume an arcuate configuration, the amount of bend or arcuateness depending upon the force which is applied to the further end of the tension means. The tension means according to a preferred embodiment, comprise tension strap means extending longitudinally of the guard arm. As may be readily understood, the tension strap means must be placed within the segmented portion of the guard arm and, if desired, may extend through the relatively rigid portion of the guard arms.

A vehicle restraint system constructed according to the present invention may include one or more of the above described guard arms. According to one aspect of the present invention, a plurality of such guard arms are adpated to engage an occupant of a vehicle at strategic anatomical areas of the body. It has been found that four anatomical areas of the body may be suitably restrained by the guard arms of the present invention, these areas including the two top shoulder/chest regions and the two frontal/side pelvic regions. Thus, according to this aspect, there is provided for an upper guard arm assembly and a lower guard arm assembly, each of said guard arm assemblies including a pair of guard arms.

Considering this aspect, there is provided for a pair of side guard arms for each vehicle occupant adapted to engage the two frontal/side pelvic regions of the occupant. The side guard arms are movable with respect to the seat portion of the vehicle such that, when not in operative restraining relationship with the occupant, they are in an out-of-the-way position to permit convenience of the passengers in ingressing and egressing from the vehicle. More particularly, the side guard arms each have a preformed relatively rigid portion which is adapted to engage and restrain the desired body portion of the occupant. As such, the preformed portion may consist of a relatively straight portion with an arcuately tapering end portion adapted to engage the frontal pelvic area. Integral with and forming a continuation of the preformed portion is a further segmented portion of the above described construction. This may be connected to a still further preformed relatively straight portion if desired. Also, as mentioned above, tension strap means are provided within the guard arm.

When the guard arms of the lower guard arm assembly are not in a deployed position, they preferably extend parallel to and adjacent to the seat back. To this end, the guard arms are preferably pivotly connected to a portion of the seat structure. When actuated, the guard arms will pivot in a direction towards the seat and then move to the restraining position. Means may also be included for manually shifting the guard arms between their storage position and the position which they assume when deployed.

There may also be employed other means of storing or placing the guard arms between their storage position and the position which they assume when deployed.

There may also be employed other means of storing or placing the guard arms in an out-of-the-way position when they are not being utilized. Thus, with the bendable construction of the present invention, storage means such as a guide channel underneath the vehicle seat could conceivably be used, wherein the guard arms are retracted in the channel or storage means. In such an embodiment, further means would be employed to force the guard arms out of the channel into operative restraining relationship with a passenger.

As aforementioned, the present invention also contemplates an upper guard arm assembly, said upper guard arm assembly adapted to restrain a passenger in a seat about the shoulder/chest region. The upper guarda arm assembly, according to this embodiment, comprises a pair of upper guard arms having a portion thereof which is bendable in the manner described with respect to the guard arms in the lower guard arm assembly. In a preferred embodiment, a furtther relatively rigid preformed portion is utilized at one end, with the segmented construction being the portion adapted to encircle the passenger. Furthermore, there may be provided for padding means associated with the pair of upper guard arms as will be more clearly described hereinafter.

Also, each of the upper guard arms may be of the segmented construction described above. Means for bending the guard arms comprise tension means — e.g. tension strap means, similar to those employed with respect to the lower guard arms.

The present invention contemplates means applying a force to the other end of the tension strap means. Such means may comprise any suitable; a conventional and well known means being electric motor means operatively associated with the vehicle's electrical system. Before applying a force to the free end of the tension strap means, a reel-like device may be employed. By a suitable rotation of the reel, the tension strap means would be wound thereon applying a force to the tension strap causing the segmented or bendable portion to assume an arcuate configuration.

The drive means adapted to supply the winding force to the reel device may do so through any number of conventional arrangements. Furthermore, a separate drive means may be employed for each and every guard arm or guard arm assembly; alternatively, one suitable drive means may be employed which is tied in with a plurality of guard arms or guard arm assemblies.

A further feature of the present invention relates to positioning means operatively associated with at least the upper guard arm assembly whereby said upper guard arm assembly may be adjusted according to the passenger to be restrained. In one particular embodiment of the positioning means, a mounting member may extend vertically along the seat back. Cooperating means for slideably mounting the upper guard arm assembly on the mounting means may be employed and are well known to those skilled in the art. According to a particular embodiment of the prsent invention, the vertically extending mounting member may have a groove within one face adapted to receive a mating projection on the upper guard arm assembly whereby the upper guard arm assembly is vertically moveable within the mounting member. It may be understood of course, that any suitable alternative arrangement may be utilized.

In order to position the upper guard arm assembly, a pair of pulleys may be employed. These pulleys may be rotatably driven by any suitable drive means; in a preferred aspect, the drive means for the pulley arrangement is tied in to the drive means for the tension straps.

The seats upon which the occupant(s) of the vehicle are seated may be any suitable; it being preferred that a separate back structure hingeably moveable with respect to the seat portion be provided. Such seats are well known and utilized in many automotive vehicles. In conjunction with the back portion of the seat, suitable head rest means may also be employed.

In order to prevent the hingeable back portion of the seating means from being thrown forward in a collision, the system of the present invention contemplates inertia reel means. Such inertia reel means may comprise an inertia reel fixedly mounted to a portion of the vehicle. From the inertia reel, a suitable strap or the like may extend to the back portion and be secured thereto. Under normal conditions, the seat is hingedly moveable in a forward direction and the inertia reel does not interfere with the movement. Under a sudden deceleration, the inertia reel would not permit forward hinging movement of the seat back. Such inertial reels are well known and are presently employed in many automotive vehicles.

The guard arms of the present invention are particularly suitable for use in a "passive restraint system". As such, the guard arms may be actuated and deployed in response to suitable signals from the vehicle and components thereof. Thus, it is well known in the art to have sensor means located within the seat such that a predetermined weight placed upon the seat will actuate the restraint system. Such a sensor means may also operate in conjunction with additional means located in the transmission of the vehicle such that the system is only actuated when the vehicle is placed in condition for travel. Any such suitable and conventional means may be employed in conjunction with the restraint system and guard arms of the present invention. Furthermore, the guard arms of the present invention are described with respect to being actuated by the occupancy of the seat although such a system, may, if desired, operate in conjunction with sensors presently envisioned for other passive restraint systems such as air bag systems.

According to a further aspect of the present invention, there is provided for a novel construction relating to the restraining portion of a guard arm adapted to restrain the shoulder/chest area of a passenger. According to this aspect, the end of a guard arm or a restraining member adapted to restrain a passenger in a seat includes an air-bearing chamber within the guard arm structure. Reference is made to an "air-bearing chamber", it being understood that any suitable fluid material may be employed. The air-bearing chamber contains a supply of fluid therein.

There is also supplied a further reserve chamber connected to the air-bearing chamber by means of a valve. The further reserve chamber is normally in a collapsed condition outside of the guard arm. The valve, under normal conditions, does not permit the passage of the fluid from the air-bearing chamber to the further reserve chamber. However, in the event of a collision, the body of a passenger will be pushed in a forward direction and exert a pressure on the air-bearing chamber. Under these conditions, the valve means would permit the passage of the fluid to the further reserve chamber; the gradual "deflation" of the air-bearing chamber will cushion the effect of deceleration for the passenger. Furthermore, the external reserve chamber will then inflate from the fluid forced into it; the reserve chamber is positioned such that it will form a "bubble" or "air bag" effect in front of the lower head portion of the passenger. Thus, a cushioning effect is provided for the head portion of a passenger. Valve means suitable for the above described embodiment are well known in the art and need not be described herein.

According to a still further aspect of the present invention, there is provided an improved method of restraining an occupant of a seat comprising the steps of supplying at least one guard arm being adapted for bending movement, tension strap means carried within at least a portion of said guard arm, one end of the tension strap means being secured to the guard arm, the other end of said tension strap means being secured to a rotatable reel, supplying a drive means operatively associated with said reel, driving said drive means whereby said rotatable reel is rotated, and allowing said tension strap means to wind upon said reel whereby said guard arm is bent to a restraining position to at least partially encircle a portion of a body of the passenger.

In connection with the above, it may be understood that the portions of the guard arms adapted to contact the passenger may carry additional sensor means whereby said sensor means would automatically stop further motion of the guard arm once the same has contacted the passenger. Again, such a sensor means are known in the art and need not be described further herein.

Furthermore, the present invention also contemplates the use of spring means associated with the guard arm, the spring means adapted to keep the guard arm, when in a non-actuated condition, in a relatively straight planar configuration. In other words, the spring means act as a counter force against the direction in which the guard arm is bent by the tension means. These spring means may be placed interiorly of the guard arm; in a preferred embodiment one face of the guard arm is of a flexible material which, after being bent, will tend to return to its original position. Many plastics material may be employed in this respect.

Having thus generally described the invention, reference will be made to the accompanying drawings illustrating a preferred embodiment thereof, and wherein: pair FIG. 1 is a side elevational view of a passenger restraint system according to the present invention in an activated configuration;

FIG. 2 is a front elevational view of the system of FIG. 1;

FIG. 3 is a rear elevational view of the system of FIG. 1;

FIG. 4 is a side elevational view of the system of FIG. 1 wherein the system is in a non-actuated configuration;

FIG. 5 is a front elevational view of the system of FIG. 4 in a non-actuated configuration;

FIG. 6 is a rear elevational view of the systems of FIGS. 4 and 5;

FIG. 9 is side sectional view of a guard arm construction;

FIG. 10 is a schematic side sectional view of one end of an upper guard arm employing the head protector of the present invention in a non-load configuration;

FIG. 11 is a cross sectional view of the guard arm of FIG. 10 under an impact load;

Figure 8:
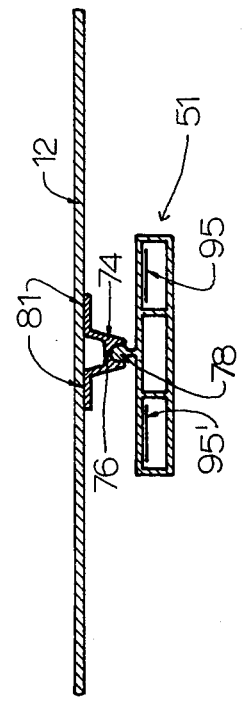
FIG. 8 is a cross sectional view of an upper guard arm assembly.

FIGS. 12 and 13 are side sectional views of embodiments of a segmented guard arm construction; and FIGS. 14 and 15 are cross sectional views of the guard arms of FIGS. 12 and 13 respectively.

Referring now in more detail and by reference characters to the drawings, there is illustrated therein a preferred embodiment of the restraint system of the present invention. In FIG. 1, a passenger 10 is restrained in a seat with the restraint system. As shown, a typical seating means comprising seat portion 14 and back rest structure 12 may be employed. As is conventional, padding means 15 and 13 may be associated with seat portion 14 and back structure 12 respectively. Also, head rest means 20 form an integral portion of the back rest structure 12 and gives support to the head of passenger 10.

In the illustrated embodiment, a lower guard arm assembly comprising lower guard arms 16 and 16' is utilized to restrain the hip/frontal portions of passenger 10. Similarly, an upper guard arm assembly comprising upper guard arms 18 and 18' restrain the shoulder/chest area of passenger 10. Thus, four guard arms may be employed to restrain each passenger; one passenger is illustrated, it being understood that a similar system may be employed for each vehicle occupant.

Each of the lower guard arms 16 and 16' are adapted to, when deployed, bend to a restraining position to at least partially encircle the hip/front portion of passenger 10. To this end, a portion of the guard arm is bendable. In FIG. 5, the portion designated generally by reference numeral 9 is of a bendable construction with the reamining portion designated generally by reference numeral 7 being of a relatively rigid preformed construction and not bendable.

Referring to FIGS. 12 and 14, a typical construction of the bendable portion is illustrated. The guard arm is illustrated as being of a substantially rectangular cross sectional configuration and has a pazir of opposed major faces 22 and 28. Intermediate faces 22 and 28 are shaped arm segments 26. These shaped arm segments 26 allow the guard arm to bend in a manner to be more fully described hereinafter. Shaped arm segments 26 may be bonded to major faces 22 and 28 in a conventional manner. Facing outwardly from face 28 and attached thereto are spring means 24. Spring means 24 act to keep the bendable arm portion, when not under a further force, in a straight line configuration. Also illustrated in FIGS. 12 and 14 is a tension strap running interiorly of the guard arm and being designated generally by reference numeral 30.

Normally, when guard arms 16 and 16' are in a non-deployed position they assume the position illustrated in FIGS. 4 to 6, wherein they are parallel to seat back structure 12. Thus, the ingress and egress of a passenger from the seat is readily permitted. Guard arm 16 is pivotly secured to the seat structure at a pivot point designated generally by reference numeral 62. Tension strap 48 associated with guard arm 16 has one end thereof secured to the interior of guard arm 16 (not shown). The other end of tension strap 48 is secured to a reel 44 which, may be securely mounted to an appropriate frame member or the like of the vehicle. In a similar manner, tension strap 48' of guard arm 16' has one end secured to a reel 44'.

Drive means 36 comprises an electric motor associated with the electric system of the vehicle. Drive means 36 is adapted to rotatably drive a shaft 38 to which is secured a first bevel gear 40. A further bevel gear 42 operatively associated with first bevel gear 40 is rotatably driven thereby and in turn drives reel 44' in a rotatable manner. Similarly, reel 44 is also rotatably driven. When reels 44 and 44' are rotatably driven, tension straps 48 and 48' are wound upon reels 44 and 44' respectively thereby exerting a tensile force on the tension straps. Due to the aforedescribed segmented portions of the guard arms, the guard arms will bend through their segmented portion and move to the restraining position shown in FIGS. 1 to 3.

Adapted to operate in conjunction with guard arms 16 and 16' are width adjustment hip/arm pivot points 52 and 52'; width adjustments 52 and 52' are adapted to hold guard arms 16 and 16' respectively in a predetermined position, however, width adjustments 52 and 52' permit manual adjustment of the positioning of guard arms 16 and 16'. When in their restraining position, guard arms 16 and 16' have a padding 19 and 19' associated with the portion adapted to engage and restrain passenger 10. Padding 19 and 19' may be any suitable and conventional.

When the duration of travel is finished, reel 44 may be unwound allowing tension strap 48 to return to the interior of guard arm 16. Due to the spring nature of spring means 24 above mentioned, the segmented portion will return to a straight line configuration and guard arm 16 will move in an outward manner with respect to passenger 10. Then, due to pivot point 62, the guard arm 16 may be returned to the position shown in FIGS. 4 to 6.

As shown in the drawings, the present invention also contemplates an upper guard arm assembly generally designated by reference numeral 51 and comprising a pair of upper guard arms 18 and 18'. Each of the guard arms 18 and 18' are of a similar construction and reference herein will be made to guard arm 18, it being understood that guard arm 18' is substantially identical.

Guard arm 18 is illustrated in FIG. 9 and reference will now be made thereto. Guard arm 18 includes a relatively rigid preformed portion designated generally by reference numeral 105; the balance of guard arm 18, except for the very end portion, being of a segmented construction. The segmented construction is similar to that mentioned with respect to guard arm 16 and includes the major face 22 with a spring means 24 associated with a further major face 28. Also, as shown, a tension strap 30 runs interiorly of guard arm 18 between shaped arm segments 26. In the embodiment illustrated in FIG. 9 guard arm 18 is bent or in an arcuate configuration and it may be seen that the shaped arm segments 26 are substantially in juxtaposition to each other. Tension strap 30 is attached interiorly of the guard arm at one end thereof and runs the longitudinal length of the guard arm. At one end of the guard arm 18 is a reel 32 to which the other end of the tension strap 30 is secured. it may be noted that the end adapted to encircle and restrain the passenger includes padding 31 thereon.

FIGS. 4 to 6 illustrate upper guard arm assembly 51 comprising upper guard arms 18 and 18' in their non-actuated or non-deployed position. It may be noted that upper guard arms 18 and 18', like lower guard arms 16 and 16' are substantially parallel to seat back structure 12 and in an out-of-the-way position to permit easy ingress and egress of passengers from the vehicle. Upper guard arms 18 and 18' operate in a manner similar to that described with respect to lower guard arms 16 and 16'. To this end, drive means 36 is adapted to rotatably drive reels 54 and 54' associated with guard arms 18 and 18' respectively, thus, a drive cable 50 is operatively associated with drive means 36 and adapted to rotatably drive reels 54' and 54.

As best shown in FIGS. 3 and 6, the present invention may also include positioning means for upper guard arms 18 and 18'. The positioning means includes an upper guard arm assembly mounting rail 74 extending substantially vertically along seat back structure 12. Upper guard arm assembly mounting rail 74, as shown in FIG. 8, includes a pair of flanges 81 which may be mounted to seat back structure 12 by any suitable means known to those well skilled in the art. A groove or channel 76 extends longitudinally of mounting rail 74 and is adapted to receive a mating projection 78 extending from upper guard arm assembly 51. Shown interiorly of the upper guard arm assembly are tension straps 95 and 95' associated with guard arms 18 and 18' respectively.

A pair of pulleys 68 and 70 are rotatably secured to mounting rail 74 and have a cable 72 entrained thereabout. Pulley 70 is rotatably driven by drive means 36 to which it is connected by a suitable shaft 75. Thus, upper guard arm assembly 51 may be raised or lowered through drive means 36.

A further feature of the present invention is best illustrated in FIGS. 10 and 11 and comprises a pneumatic restraint means incorporated into upper guard arm 18. A chest restraint pad 86 has attached thereto a pad cushion liner 88. A somewhat flexible liner 90 encloses a fluid chamber or air bearing space 91 which is normally in juxtaposition to the passenger. Further liner material 94, in the non-load configuration shown in FIG. 10, forms a further deflated chamber. Intermediate the further chamber and normally filled fluid chamber 91 are valves means 92. The material filling chamber 91 may be any fluid suitable, air is most common.

FIG. 11 illustrates the above feature of the present invention when uner a load — i.e. when an accident has occurred. In this case, the passenger is thrown forward and exerts a force on fluid chamber 91. Fluid chamber 91 gives a "cushioning" effect and, valve means 92 which, under normal circumstances, prevents passage of fluid from chamber 91 to the further chamber, allows the fluid to pass therethrough inflating liner 94 to form further chamber 96. This further chamber 96 then acts as a restraining means for the chin/head portion of the passenger.

Under normal operating conditions, the passenger is allowed considerable ease of movement and, in particular, forward movement due to the flexing of seat back structure 12 with respect to seat means 14. As shown in FIGS. 1 and 4, an inertia reel 64 has a suitable inertia reel cable or other means 66 attached thereto, the other end being attached to seat back structure 12. The inertia reel means are well known in the art and need not be further described. Under the above normal circumstances, the passenger is permitted to lean forward whereby seat back structure 12 will also move in a forward direction.

Figure 7:
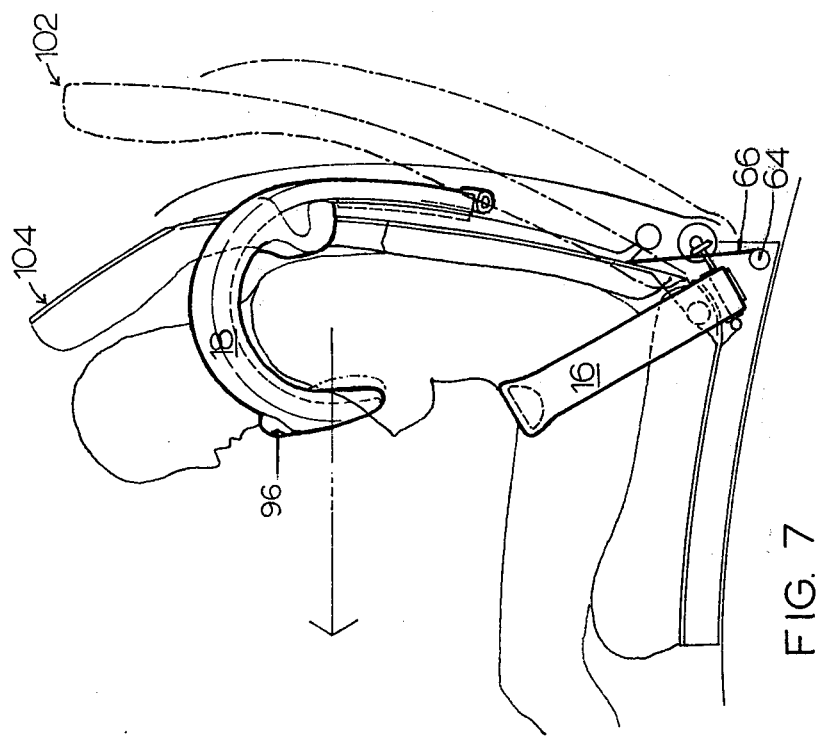
FIG. 7 is a side elevational view of the system of FIG. 1 under an impact load.

However, as illustrated in FIG. 7, under a load condition such as an accident, the seat back structure which would normally be in the position designated generally by reference numeral 102, will move in a forward direction to that designated by reference numeral 104. However, further movement will be prevented by inertia reel 64 and the passenger will be restrained by guard arm 16, 16', 18 and 18'. Furthermore, the head/chin portion of the passenger will be restrained by further chamber 96 above described.

A further embodiment of the segmented or bendable portion of the guard arms of the present invention is illustrated in FIGS. 13 and 15. As shown, the shaped segments 80 have a somewhat different configuration and may incorporate a spring means 84 to which the shaped segments 80 are directly secured. Such an embodiment does not require the interior face 28 described with respect to FIGS. 12 and 14. In this case, tension strap 82 runs interiorly of shaped segments 80.

It will be understood that many modifications and additions may be made to the restraint system of the present invention. Thus, for example, the bendable guard arms are particularly suitable for a passive restraint system, and to this end, suitable seat sensor means alone or in combination with further means may be utilized to automatically actuate the guard arms under predetermined circumstances. Such systems are well known to those skilled in the art and have been described in the prior art. Furthermore, the ends of the guard arms adapted to engage and restrain the passenger in the seat may incorporate further sensor means therein whereby the travel of the guard arm is arrested once the guard arm contacts the passenger.

Furthermore, the materials used in the construction of the system of the present invention may be any suitable. Thus, the guard arms are required to be of a somewhat flexible nature and suitable materials may be chosen from plastics materials of the like. Similarly, the spring means adapted to normally keep the guard arms in a straight line configuration may be chosen from any group of such materials. Although the restraint system of the present invention is described with respect to employing four guard arms, fewer may be utilized if so desired. Thus, for example, in the case of children, the upper guard arms may not be actuated, the restraint being provided by the pair of lower guard arms.

Thus, it is obvious that many modifications may be made to the present invention which do not depart from the spirit and scope thereof. The present invention is not limited by the above described examples, but rather by the claims appended hereto.

I claim:

1. In a vehicle restraint system having at least one guard arm, the improvement wherein at least a portion of said guard arm is adapted for bending movement, tension means carried within at least said portion of the guard arm, one end of the tension means being secured to the guard arm, and means to apply a force to the other end of the tension means to bend the guard arm to a restraining position to at least partially encircle a portion of a body of a vehicle occupant.

2. The restraint system of claim 1, wherein said restraint system includes an upper guard arm assembly and a lower guard arm assembly, each of said upper and lower guard arm assemblies comprising a pair of said guard arms.

3. The system of claim 1, wherein said guard arms are elongated guard arms.

4. The system of claim 3, wherein said tension means comprise elongated tension belt means.

5. The restraint system of claim 1, wherein only a portion of said guard arm is adapted for a bending movement.

6. The restraint system of claim 5, wherein said portion of said guard arm adpated for bending movement is a segmented portion.

7. The vehicle restraint system of claim 1, wherein the restraint system is a passive restraint system.

8. The restraint system of claim 7, wherein said system includes seat sensor means associated with said guard arm, said seat sensor means adapted to actuate said guard arm when a passenger is seated in the vehicle.

9. The system of claim 8, wherein said seat sensor means operate in conjunction with further means such that said guard arms are actuated only when the vehicle is in motion.

10. The system of claim 2 including padding means, said padding means extending along a portion of said guard arms, said portion being adapted to at least partially encircle the vehicle occupant.

11. The system of claim 2, wherein said lower guard arm assembly comprises a pair of said guard arms, each of said pair of guard arms being positioned on either side of a passenger, each of said guard arms adapted for bending movement along a portion thereof to a restraining position to at least partially encircle a side hip portion of a vehicle occupant.

12. The system of claim 2, wherein said upper guard arm assembly comprises a pair of guard arms, each of said guard arms being adapted for bending movement such that at least a portion of said guard arms is adapted to restrain the shoulder/chest portion of a vehicle occupant.

13. The system of claim 2, wherein at least one of said guard arms includes location sensor means, said location sensor means sensing when said guard arm is in a restraining position relative to the vehicle occupant.

14. The system of claim 11, wherein each of said pair of lower guard arms includes pivoting means, whereby each of said lower guard arms may be pivotably moved in a direction perpendicular to the plane of the longitudinal axis of said guard arms.

15. The system of claim 5, wherein said portion of said guard arm adpated for bending movement includes spring means, said spring means adapted to return said guard arm to a generally straight planar condition when a force is not applied to said tension means.

16. The system of claim 2, including positioning means for positioning said upper guard arm assembly.

17. The system of claim 12, including padding means on the portion of said upper guard arms adapted to restrain the shoulder/chest area of the vehicle occupant, said padding means including fluid restraint means, said fluid restraint means comprising a first fluid chamber having fluid therein positioned approximate to the passenger, valve means operatively associated with said first fluid chamber, and a further chamber, the fluid in said first fluid chamber passing through said valve means into said further chamber when a force is applied thereto, said further chamber forming a cushion for th chin/face portion of a passenger.

18. The system of claim 16, including seat means and seat back means, wherein said seat back means are hingeable with respect to said seat means, the improvement wherein the system includes inertia reel means, belt means, one end of said belt means being connected to said inertia reel means, the other end of said belt means being connected to said seat back means.

19. The system of claim 2, including drive means and reel means, one end of said tension belt means being connected to said reel means, said drive means being adpated to drive said reel means whereby said tension belt means are wound about said reel means thereby applying a force to said tension belt means.

20. A vehicle restraint system comprising at least one elongated guard arm having at least one portion thereof adapted for bending movement, said portion being of a segmented construction, eleongated tension strap means carried within at least the segmented portion of said guard arm, one end of said tension strap means being secured to the guard arm, the other end of said tension strap means being secured to a reel whereby said tension strap means are wound thereupon causing said segmented portion to bend and said guard arm to move to a restraining position to at least partially encircle a portion of a body of a vehicle occupant.

21. The system of claim 18, wherein said means for positioning said upper guard arm assembly includes a mounting rail means, said mounting rail means being secured to the seat back means, said mounting rail means extending vertically of said seat back means, said mounting rail means including a channel running longitudinally thereof, said upper guard arm assembly including a projection adapted to slidingly engage in said channel.

22. The system of claim 21, wherein said positioning means additionally includes a pair of rotatable pulleys with a cable entrained thereabout, said cable being secured to said upper guard arm assembly, one of said pulleys being operatively associated with said drive means.

23. The vehicle restraint system of claim 20, wherein said restraint system includes an upper guard arm assembly and a lower guard arm assembly, each of said upper and lower guard arm assemblies comprising a pair of said guard arms, each of said lower guard arms adapted to restrain a hip portion of the vehicle occupant, each of said upper guard arms adatped to restrain the shoulder/chest portion of the vehicle occupant.

24. The vehicle restraint system of claim 23, wherein said vehicle restraint system is a passive restraint system including sensor means, said sensor means adapted to automatically deploy said guard arms under predetermined conditions.

25. The vehicle restraint system of claim 24, wherein said guard arms include spring means integral therewith, said spring means adapted to return said guard arms to a straight line configuration when the force is not applied to the tension means.

26. The system of claim 25, including seat means and seat back means, said seat back being hingeable with respect to said seat portion, and inertial reel means, said inertia reel means being operatively connected to said seat back structure.

27. The vehicle restraint system of claim 26, wherein said upper guard arm assembly includes positioning means.

28. The vehicle restraint system of claim 27, including chin/head restraint means, said restraint means comprising a first fluid retaining chamber on said guard arm, said fluid retaining chamber being in juxtaposition to the passenger, a further chamber, valve means intermediate said fluid retaining chamber and said further chamber, said valve means preventing the passage of fluid from said fluid retaining chamber to said further chamber under normal conditions of operation, said valve means permitting said fluid from said fluid retaining chamber to pass to said further chamber under high external pressure, said further chamber forming a cushion for the chin/head portion of the vehicle occupant.

29. A method of restraining a seat occupant comprising the steps of supplying at least one guard arm, said guard arm being adapted for bending movement, said guard arm having tension means carried within, sand one end of the tension means being secured to the guard arm, applying a force to the other end of the tension means to bend the guard arm to a restraining position to at least partially encircle a portion of the body of the vehicle occupant.

* * * * *